(12) United States Patent
Tsuji et al.

(10) Patent No.: US 8,508,075 B2
(45) Date of Patent: Aug. 13, 2013

(54) ELECTRONIC DEVICE AND ELECTRONIC SYSTEM

(75) Inventors: Yasushi Tsuji, Kobe (JP); Atsushi Fujita, Kobe (JP); Hiroshi Ueno, Kobe (JP); Ryoh Ogata, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 499 days.

(21) Appl. No.: 12/936,923

(22) PCT Filed: Dec. 11, 2008

(86) PCT No.: PCT/JP2008/072552
§ 371 (c)(1),
(2), (4) Date: Nov. 10, 2010

(87) PCT Pub. No.: WO2009/125521
PCT Pub. Date: Oct. 15, 2009

(65) Prior Publication Data
US 2011/0057509 A1   Mar. 10, 2011

(30) Foreign Application Priority Data
Apr. 10, 2008   (JP) ................... 2008-102867

(51) Int. Cl.
*H02J 3/30* (2006.01)
(52) U.S. Cl.
USPC ............................................. 307/85; 307/64
(58) Field of Classification Search
USPC ..................................... 307/85, 64
See application file for complete search history.

(56) References Cited

U.S. PATENT DOCUMENTS

| | | | |
|---|---|---|---|
| 5,917,435 A | 6/1999 | Kamiya et al. | |
| 7,231,174 B2 | 6/2007 | Sato | |
| 2004/0036769 A1 | 2/2004 | Sadahiro | |
| 2004/0204840 A1 | 10/2004 | Hashima et al. | |
| 2006/0277555 A1 | 12/2006 | Howard et al. | |
| 2007/0196099 A1 | 8/2007 | Ishiyama et al. | |
| 2009/0293068 A1 | 11/2009 | Yagiu | |

FOREIGN PATENT DOCUMENTS

| | | |
|---|---|---|
| JP | U-59-98128 | 7/1984 |
| JP | U-61-16631 | 1/1986 |
| JP | A-5-153024 | 6/1993 |
| JP | A-8-318792 | 12/1996 |
| JP | A-2001-239895 | 9/2001 |
| JP | A-2002-328026 | 11/2002 |
| JP | A-2003-166848 | 6/2003 |
| JP | A-2003-191803 | 7/2003 |
| JP | A-2003-241863 | 8/2003 |
| JP | A-2004-94732 | 3/2004 |

(Continued)

OTHER PUBLICATIONS

Search Report issued in European Application No. 08 87 3858 dated Aug. 19, 2011.

(Continued)

*Primary Examiner* — Lribert L. Deberadinis
(74) *Attorney, Agent, or Firm* — Oliff & Berridge, PLC

(57) ABSTRACT

A vehicle-mounted device that is capable of attaching and detaching a portable device including a rechargeable battery, and supplies an electric power to the portable device in a attachment state where the portable device is attached, the electronic device characterized by comprising: a controller that confirms completion of the operation of the portable device when a power source of the electronic device is turned off in the attachment state; and a voltage converting device that stops supplying the electric power to the portable device after the confirmation by the controller.

5 Claims, 11 Drawing Sheets

(56) References Cited

FOREIGN PATENT DOCUMENTS

| | | |
|---|---|---|
| JP | A-2005-173653 | 6/2005 |
| JP | A-2005-524570 | 8/2005 |
| JP | A-2007-228143 | 9/2007 |
| JP | A-2007-292569 | 11/2007 |
| WO | WO 03/094286 A2 | 11/2003 |
| WO | WO 2008/018115 A1 | 2/2008 |

OTHER PUBLICATIONS

International Search Report for International Patent Application No. PCT/JP2008/072552, mailed on Jan. 27, 2009 (w/ English translation).

ELECTRONIC DEVICE AND ELECTRONIC SYSTEM

FIELD OF THE INVENTION

The present invention relates to an electronic device and an electronic system.

BACKGROUND OF THE INVENTION

As conventional navigation apparatuses, there are widely known small-sized portable navigation apparatuses with simplified structure and portability (hereinafter, referred to as Portable Navi), also known as Personal Navigation Device; and vehicle-mounted navigation apparatuses accommodated and fixed in a recess portion (DIN opening) formed in a dashboard of a vehicle. The vehicle-mounted navigation apparatuses are capable of guiding with high accuracy by use of the information supplied from vehicles such as vehicle speed, and some of the vehicle-mounted navigation apparatuses are equipped with audio devices.

In recent years, the navigation apparatuses with portability of the Portable Navi and high-accuracy guide function of the in-vehicle navigation apparatus have been studied.

References 1 to 4 disclose a configuration where a navigation portion can be attached and detached to/from an in-vehicle apparatus mounted in a vehicle. By removing the navigation portion from the in-vehicle apparatus, the navigation portion can be used as a Portable Navi of a single unit.

Also, as disclosed in Reference 5, the navigation apparatus is taken out of the vehicle and can be used while walking. In addition, when mounted in a vehicle, the navigation apparatus is in a car-navigation mode, and when taken out of the vehicle, the navigation apparatus is in a person-navigation mode.

[Reference 1] Japanese Unexamined Patent Publication No. 8-318792
[Reference 2] Japanese Unexamined Patent Publication No. 2002-328026
[Reference 3] Japanese Unexamined Patent Publication No. 2005-524570
[Reference 4] Japanese Unexamined Patent Publication No. 2001-239895
[Reference 5] Japanese Unexamined Patent Publication No. 2003-166848

DISCLOSURE OF THE INVENTION

Problems to be Solved by the Invention

Incidentally, the above-mentioned Portable Navi operates by receiving an electric power from the vehicle-mounted device in an attachment state where the Portable Navi is attached to the vehicle-mounted device. On the other hand, when a power source of the vehicle-mounted device is tuned off, the Portable Navi receives an electric power from a rechargeable battery included therein, stores various data into a nonvolatile memory such as a flash memory, and then completes operation of the Portable Navi (i.e., executes a shutdown process).

However, when the electric power is not charged in the rechargeable battery, or the electric power from the rechargeable battery is not enough, if the power source of the vehicle-mounted device is tuned off, the electric power from the rechargeable battery is not stably supplied to the Portable Navi during the shutdown process, and hence the Portable Navi may execute an abnormal shutdown process in which the various data is not stored.

The present invention has been made in view of the above circumstances, and an object of the present invention is to provide an electronic device and an electronic system that can normally execute a shutdown process of a portable navigation device even when an electric power from a rechargeable battery is not supplied during the shutdown process.

Means to Solve the Problems

To attain the above object, according to a first aspect of the present invention, there is provided an electronic device that is capable of attaching and detaching a portable device including a rechargeable unit, and supplies an electric power to the portable device in a attachment state where the portable device is attached, the electronic device characterized by comprising: a control portion that confirms completion of the operation of the portable device when a power source of the electronic device is turned off in the attachment state; and a voltage converting portion that stops supplying the electric power to the portable device after the confirmation by the control portion.

With this construction, the electronic device supplies the electric power to the portable device until the electronic device receives information showing the completion of the operation from the portable device.

Effects of the Invention

In accordance with the present invention, even when the electric power from the rechargeable battery of the portable device may not supplied during the shutdown process of the portable device, the electric power from the electronic device can be supplied to the portable device thereby normally executing the shutdown process of the portable device.

DESCRIPTION OF THE PREFERRED EMBODIMENTS

The following is a detailed description of preferred embodiments of the present invention, with reference to the accompanying drawings.

Figure 1:
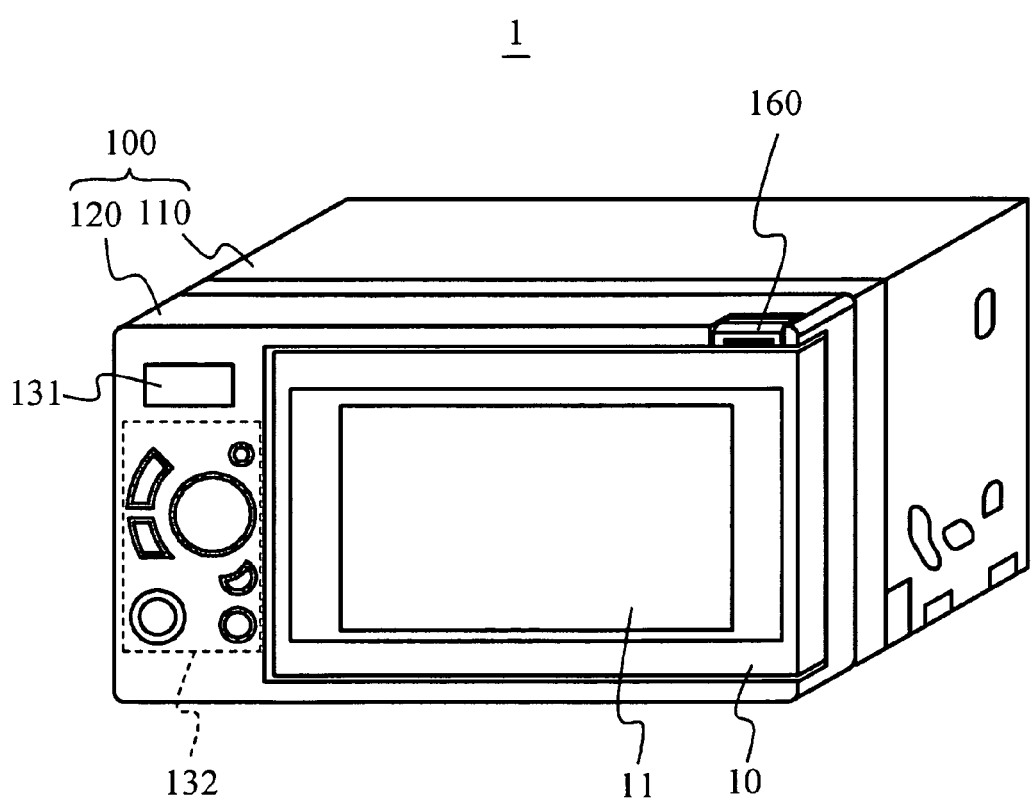
FIG. 1 is a diagram showing an exterior of a vehicle-mounted system.

FIG. 1 is a diagram showing an exterior shape of a vehicle-mounted system 1 as an example of an electronic system.

As shown in FIG. 1, the vehicle-mounted system 1 is composed of: an vehicle-mounted device 100 (electronic device) to be mounted in a vehicle; and a portable device 10 (portable device) with navigation capabilities. The portable device 10 can be used after being attached at a front face portion 120 of the vehicle-mounted device 100, and can be also used alone after being detached from the vehicle-mounted device 100.

The vehicle-mounted device 100 has a playing function of radio broadcasting and a playing function of music data and video data recorded on a recording medium such as a CD (Compact Disk) and a DVD (Digital Versatile Disk). Also, the vehicle-mounted device 100 includes: a main unit 110 having a player of the recording medium and an insertion/ejection slot of the recording medium; and the front face portion 120 having a display unit 131 and an operating unit 132. The portable device 10 has navigation capabilities of searching for a guiding path to a destination and displaying the searched guiding path over a map.

Figure 2:
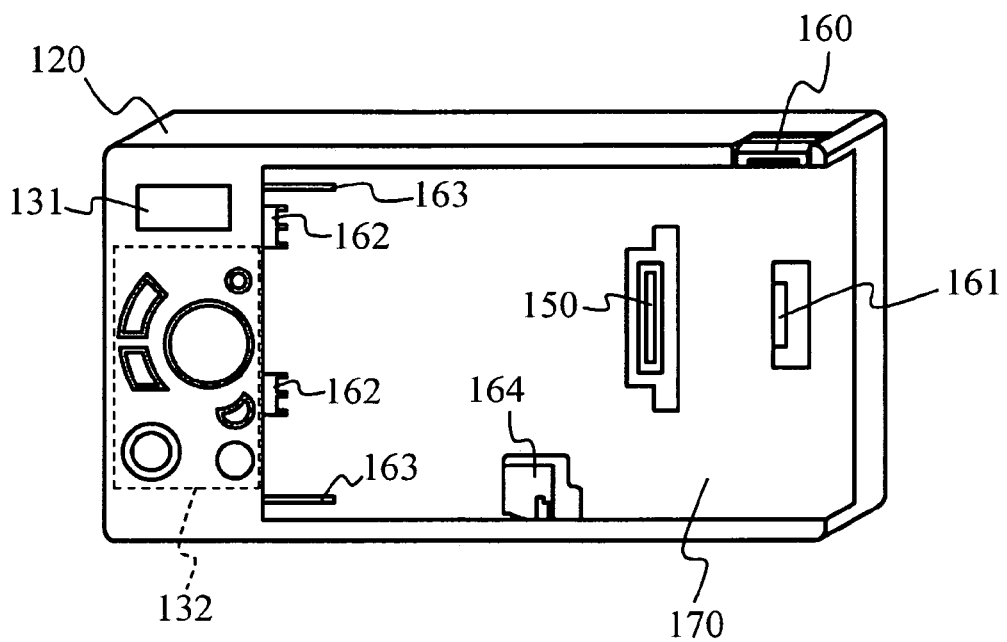
FIG. 2 is a diagram showing a front face portion of the vehicle-mounted device from which a portable device is detached.

FIG. 2 is a diagram showing the front face portion 120 of the vehicle-mounted device 100 from which the portable device 10 is detached.

There is provided an attached/detached unit 170 in which a recess portion is formed for attaching the portable device 10, at the front face portion 120 of the vehicle-mounted device 100. The attached/detached unit 170 is provided with: a connector 150 for electrically coupling the vehicle-mounted device 100 and the portable device 10; a lock unit 161 and ribs 162 for securing the portable device 10 to the front face portion 120; slopes 163 for guiding an end of the portable device 10 to the ribs 162; and a push-out unit 164 for pushing out the portable device 10 from a back direction to a front direction. When a detach button 160 provided at the front face portion 120 is operated, a lock unit 161 is unlocked and the portable device 10 is detachable from the vehicle-mounted device 100.

Figure 3:
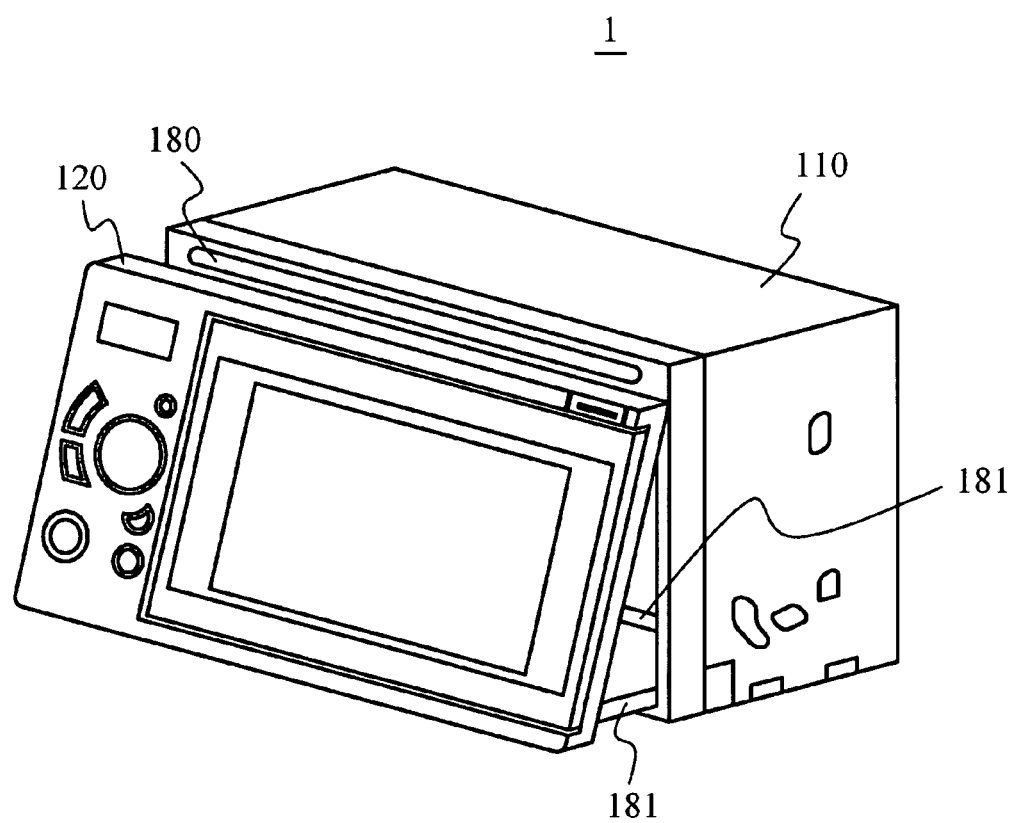
FIG. 3 is a diagram showing a state of tilting the front face portion against a main unit to expose a CD insertion/ejection slot.

FIG. 3 is a diagram showing a state of tilting the front face portion 120 against the main unit 110 to expose an insertion/ejection slot 180.

By driving a slider 181 shown in FIG. 3 with a drive mechanism, not shown, the front face portion 120 can be tilted against the main unit 110. By tilting operation, the insertion/ejection slot 180 provided in the main unit 110 is exposed, so that the recording medium can be inserted or ejected. There is provided an operation button (a tilt/eject button 132a shown in FIG. 6), at the front face portion 120 of the vehicle-mounted device 100, and a tilt angle can be set according to the operation of the button.

Figure 4:
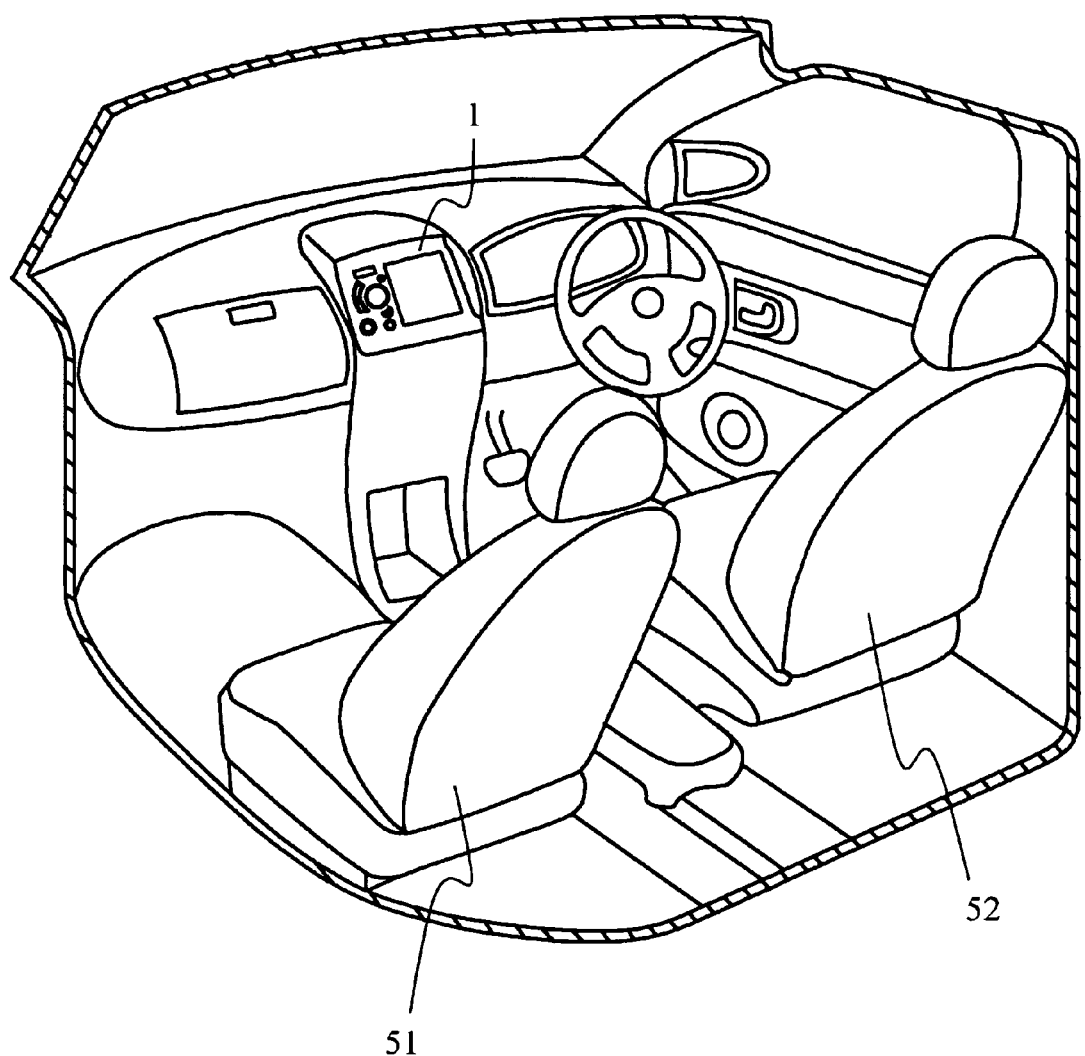
FIG. 4 is a diagram showing a state where the vehicle-mounted system has been mounted in a vehicle.

FIG. 4 is a diagram showing an example of mounting the vehicle-mounted system 1 in the vehicle.

The in-vehicle system 1 may be disposed in a dashboard portion substantially in the middle of a front-passenger's seat 51 and a driver's seat 52, as shown in FIG. 4, for example. A GPS antenna, not shown, in a GPS information receiver 133 described later is disposed on a dashboard or inside a front glass of the vehicle.

Figure 5:
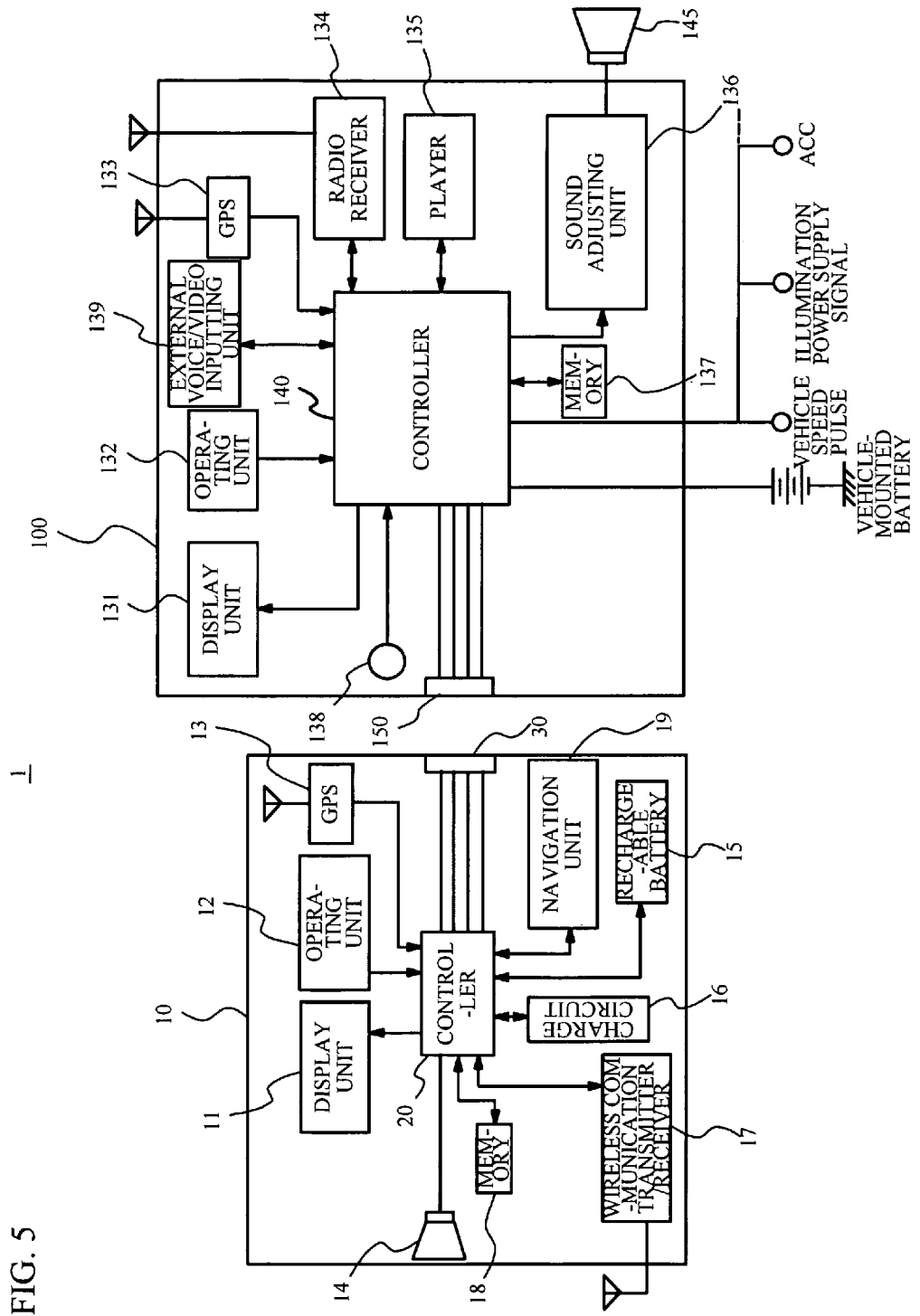
FIG. 5 is a block diagram showing a configuration of the vehicle-mounted system.

FIG. 5 is a block diagram showing a schematic configuration of the vehicle-mounted system 1.

The vehicle-mounted device 100 and the portable device 10 are electrically connected by connectors. The connector 150 is provided at a side of the vehicle-mounted device 100, and a connector 30 is provided at the portable device 10. By connecting the connectors 150 and 30, various signals are sent and received between the vehicle-mounted device 100 and the portable device 10 to function as the vehicle-mounted system 1. The connectors 150 and 30 are respectively provided with power supply terminals for supplying electric power to the portable device 10 from a vehicle-mounted battery of the vehicle. When the portable device 10 is connected to the vehicle-mounted device 100 and the electric power is supplied to the vehicle-mounted device 100, the electric power is also supplied to the portable device 10 via the power supply terminals.

The vehicle-mounted device 100 is provided with: the display unit 131; the operating unit 132; the GPS information receiver 133; a radio receiver 134; a player 135; a sound adjusting unit 136; a memory 137; a microphone 138; an external voice/video inputting unit 139; a controller 140; and the connector 150. As for the rest, the vehicle-mounted device 100 is provided with a voltage converting device, not shown, described later. The vehicle-mounted device 100 is activated by supplying the electric power from the vehicle-mounted battery of the vehicle. The vehicle-mounted device 100 turns on/off the power source by the on/off of an Acc (Accessory) signal from the vehicle.

The display unit 131 is provided with a liquid crystal panel and a backlight, and displays a frequency of the received broadcasting, a track number of music being reproduced, a music name being reproduced, and the like.

Figure 6:
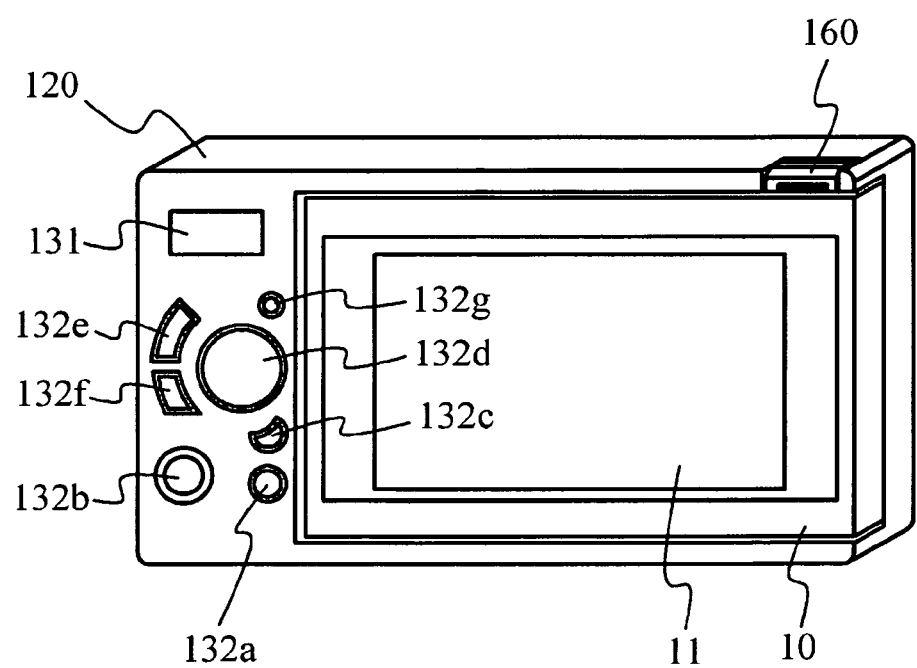
FIG. 6 is a diagram showing a configuration of the front face portion.

The operating unit 132 inputs an operation instruction for changing the operation mode of the vehicle-mounted device 100, and an operation instruction for operating in various modes that have been changed. The operating unit 132 is provided with: the tilt/eject button 132a for tilting the front face portion 120; a band/tune button 132b for changing a frequency band of the radio to be reproduced or a track number of the recording medium to be reproduced; a TEXT button 132c for changing a title displayed on the display unit 131; a SCREEN button 132d for changing an image displayed on a display unit 11 to any one of a navigation image or the video of the DVD, or for adjusting volume; a SOURCE button 132e for changing a source to be reproduced; a CONTROL button 132f for controlling tone quality; a MUTE/SCREENOFF button 132g for cutting audio or for turning on/off display of the display unit 11, as shown in FIG. 6.

Referring back to FIG. 5, the GPS information receiver 133 includes a GPS antenna and a tuner, and receives GPS signals from a satellite. The GPS signal received by the GPS information receiver 133 is output through the controller 140, the connector 150, the connector 30, and a controller 20, to a navigation unit 19 of the portable device 10, and then the position of the vehicle in which the vehicle-mounted device 100 having the portable device 10 therein is determined based on the GPS signal.

The radio receiver 134 has an antenna and a tuner, receives broadcast waves such as AM broadcasting, FM broadcasting, and sound multiplex broadcasting, outputs stereo audio signals, receives and demodulates multiplex data, and outputs the demodulated signal to the controller 140.

The player 135 reproduces the audio data and the video data recorded in the recording medium such as the CD and the DVD, and outputs the reproduced signal to the controller 140.

Herein, the demodulated signal output from the radio receiver 134 and the reproduced signal output from the player 135 may be output to the sound adjusting unit 136, described later, without through the controller 140.

The sound adjusting unit 136 implements signal processing such as volume control or tone control on an audio signal received or demodulated by the radio receiver 134 or the audio signal reproduced by the player 135, and then outputs the processed signal to a speaker 145.

The memory 137 may be composed of a RAM (Random Access Memory) from which data is readable and into which data is writable, and temporarily stores information necessary for control. The memory 137 may be composed of a ROM (Read Only Memory) such as a flash memory if needed. The microphone 138 is provided for hands-free communication, and takes in user's voices in the vehicle.

The external voice/video inputting unit 139 is provided with a connection terminal with an external device such as a USB memory or a portable audio device, so that an audio signal or data from the external device may be input. The external voice/video inputting unit 139 then sends the signal or data to the controller 140, and outputs an audio signal, data, or the like to the connected external device.

The controller 140 controls the radio receiver 134, the player 135, and the sound adjusting unit 136, according to the operation by means of the operating unit 132. Also, the controller 140 outputs various signals through the connector 150 to the portable device 10, and controls the vehicle-mounted device 100 on the basis of various signals input from the portable device 10. For example, the controller 140 outputs the GPS signal received by the GPS information receiver 133 and an audio signal input by the microphone 138, to the portable device 10 through the connector 150. It should be noted that the controller 140 is composed of a CPU or a IC such as a microcomputer. The controller 20 described later has the same construction as the controller 140.

Here, the audio signal input by the microphone 138 may be output to the portable device 10 through the connector 150, without through the controller 140.

Further, the controller 140 acquires an operation signal corresponding to a menu image of various modes displayed on the display unit 11 of the portable device 10, from the controller 20 of the portable device 10, and then controls the radio receiver 134 and the player 135.

Also, the power source from the battery mounted in the vehicle, and an ACC signal from the vehicle are supplied to the controller 140. When the ACC signal is ON, the controller 140 turns on the power source of the vehicle-mounted device 100. In such a state, when the portable device 10 is connected, the controller 140 outputs the power source supplied from the vehicle-mounted battery to the portable device 10. Here, a vehicle speed pulse and an illumination power supply signal are input into the controller 140 from a vehicle. The controller 140 transfers such input vehicle speed pulse to the controller 20 of the portable device 10. Meanwhile, the vehicle speed pulse may be configured not to be input into the vehicle-mounted device 100.

Next, a description will be given of the portable device 10. The portable device 10 is provided with: the display unit 11; an operating unit 12; the GPS information receiver 13; a speaker 14; a rechargeable battery 15; a charge circuit 16; a wireless communication transmitter/receiver 17; a memory 18; the navigation unit 19; the controller 20; and the connector 30.

The display unit 11 is provided with a liquid crystal panel and a backlight, and is capable of displaying map information generated by the navigation unit 19 and guiding path information to a destination, the received broadcasting frequency transferred from the vehicle-mounted device 100, a music track number being played, a music name being played, and the like.

Here, the display units 11 and 131 may employ a flat panel display other than the liquid crystal panel. For example, an organic light emitting display panel, a plasma display panel, a cold-cathode flat panel display, or the like may be employed.

The operating unit 12 includes a touch panel and a power button 55 (see FIG. 7A) for powering on and off the portable device 10. The touch panel may be, for example, disposed over the display screen of the display unit 11. When the touch panel is touched by a finger or a dedicated pen, the touched position is detected to determine whether or not there is an input operation. The power button 55 will be described later.

The GPS information receiver 13 includes an antenna and a tuner, and receives the GPS signal from a satellite. The received GPS signal is output to the navigation unit 19, and the vehicle location is detected based on the GPS signal. Meanwhile, the vehicle-mounted device 100 is also provided with the GPS information receiver 133. However, when the portable device 10 is attached to the vehicle-mounted device 100, the location of the vehicle in which the vehicle-mounted device 100 having the portable device 10 therein is mounted is specified by use of the GPS signal (and the vehicle speed pulse) received by the GPS information receiver 133. When the portable device 10 is used alone, the location thereof is specified by use of the GPS signal received by the GPS information receiver 13.

The speaker 14 is provided for outputting the audio information of the navigation unit 19, and outputs the audio information only when the portable device 10 is detached from the vehicle-mounted device 100, namely, used alone separately as a single unit.

The rechargeable battery 15 supplies the electric power to each unit of the portable device 10 in a state where the portable device 10 is detached from the vehicle-mounted device 100. When the portable device 10 is attached to the vehicle-mounted device 100, the electric power is supplied through the power supply terminals of the connector 30 from the vehicle-mounted battery of the vehicle, and hence the rechargeable battery 15 is charged by the charge circuit 16. Also, the charge circuit 16 receives the supply of the electric power from the connection terminal through a USB slot 57 (see FIG. 7A), and the rechargeable battery 15 can be charged.

The wireless communication transmitter/receiver 17 sends and receives the voice on communication over a mobile phone, and acquires the information used for navigation over the mobile phone. For example, Bluetooth (registered mark), which is a wireless transmission system at 2.4 GHz band, is used for the wireless communication transmitter/receiver 17.

The memory 18 may be a RAM from which data is readable and into which the data is writable, and temporarily stores the information read for each control. The memory 18 may be composed of the above-mentioned ROM.

The navigation unit 19 includes a map information storing unit that acquires map information used for navigation from an SD (Secure Digital) card or a USB memory, and stores therein, determines current location information with the GPS signal from the GPS information receiver 133 or 13, and creates a map image for navigation. The created map image may be displayed on the display unit 11. In addition, when the vehicle-mounted device 100 and the portable device 10 are connected, the vehicle speed pulse is acquired from the vehicle so that the accuracy of the location detection of the vehicle in which the vehicle-mounted device 100 having the portable device 10 therein is mounted can be improved. Also, the map information may be retained in the portable device 10.

The controller 20 controls each unit of the portable device 10. Also, the controller 20 outputs various signals to the vehicle-mounted device 100 through the connector 30, and controls the portable device 10 based on various signals input from the vehicle-mounted device 100. For example, the controller 20 acquires the GPS signal received by the GPS information receiver 133 of the vehicle-mounted device 100 and the vehicle speed pulse from the controller 140 of the vehicle-mounted device 100, and outputs the GPS signal and the vehicle speed pulse to the navigation unit 19. Also, the controller 20 acquires the audio signal input by the microphone 138 of the vehicle-mounted device 100 from the controller 140 of the vehicle-mounted device 100, and controls the navigation unit 19 according to the acquired audio signal. That is to say, the navigation unit 19 can be operated in a hands-free manner. The voice on communication over the mobile phone connected to the wireless communication transmitter/receiver 17 is output to a vehicle-mounted device side through the connector 30, and is caused to output from the speaker 145 of the vehicle-mounted device 100. The operation signal on the menu screen or content screen displayed on the display unit 11 is output to the controller 140 of the vehicle-mounted device 100 through the connector 30. The controller 140 controls the radio receiver 134 or the player 135 according to the operation signal transmitted from the controller 20 of the portable device 10. When the power source of the vehicle-mounted device 100 is turned off in a state where the portable device 10 is attached to the vehicle-mounted device 100, if a given condition is satisfied, the controller 140 stops supplying the electric power to the portable device 10.

Figure 7A:
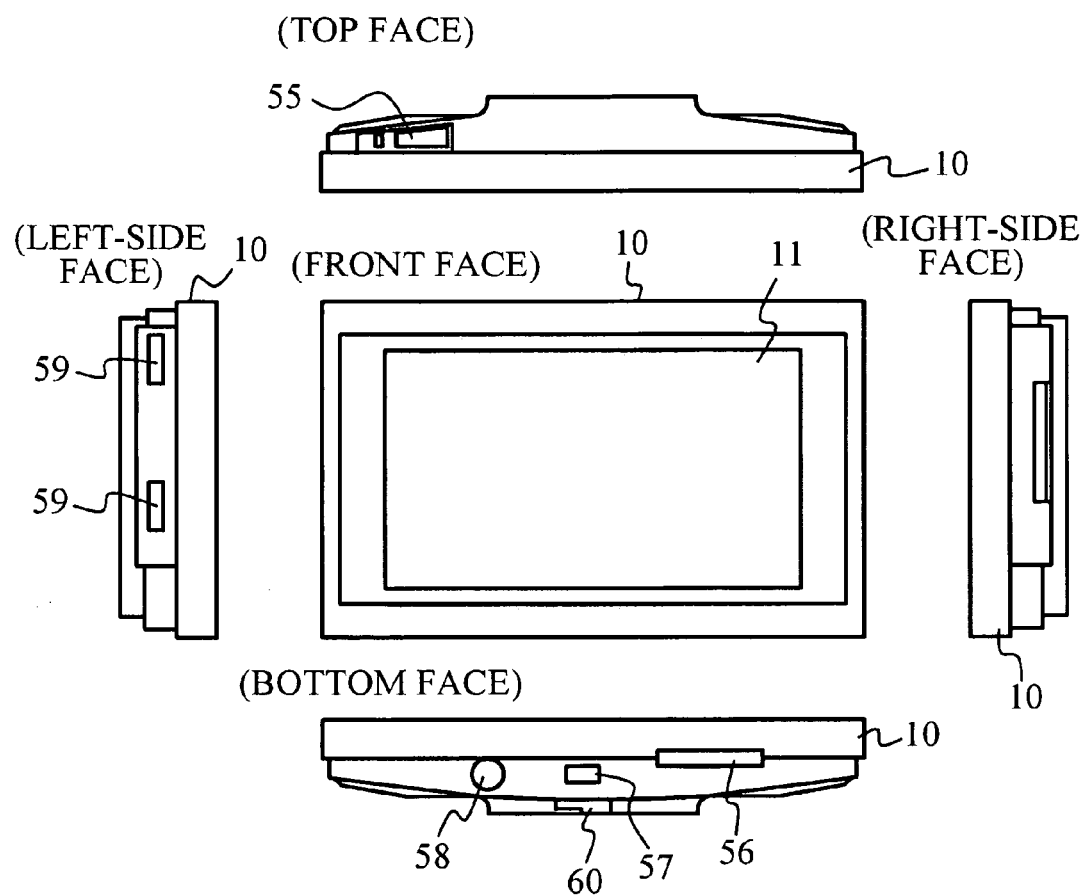
FIG. 7A shows a front view, a top view, a bottom view, a left-side view, and a right-side view of the portable device.
Figure 7B:
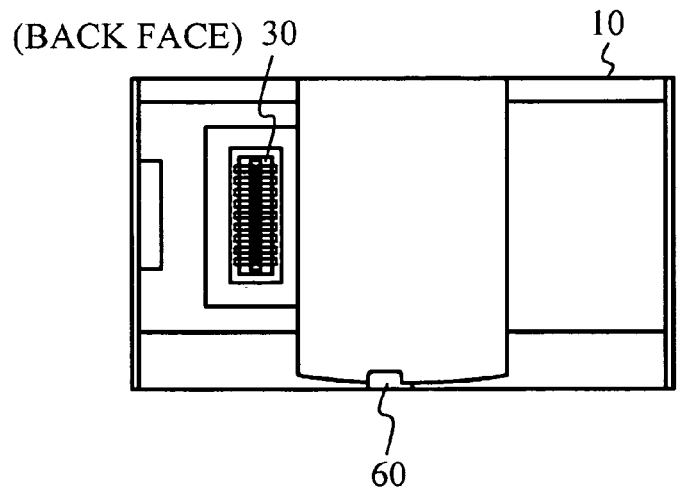
FIG. 7B shows a back view of the portable device.

FIG. 7A shows a front view, a top view, a bottom view, a left-side view, and a right-side view of the portable device, and FIG. 7B shows a back view of the portable device.

On the top face of the portable device 10, there is provided with the power button 55 for turning on or off the power of the portable device. On the bottom face of the portable device 10, there is provided with: an SD memory card slot 56; a USB slot 57; and an earphone jack 58. On the left-side face of the portable device 10, there is provided with recess portions 59 housing the ribs 162 in FIG. 2. On the back face of the portable device 10, there is provided with the connector 30 for electrically connecting the vehicle-mounted device 100. On the bottom face and the back face of the portable device 10, there is further provided with a latch unit 60 latched with the push-out unit 164 in FIG. 2.

By inserting the SD card or the USB memory, into which the map information is stored, into the SD memory card slot 56 or the USB slot 57, respectively, the controller 20 reads out the map information from the SD card or the USB memory and outputs the map information to the navigation unit 19.

The power source of the portable device 10 is turned on or off by the control from the vehicle-mounted device 100, when the portable device 10 is attached to the vehicle-mounted device 100. Also, the power source is operated on the basis of on or off operation of the power button 55, when the portable device 10 is detached from the vehicle-mounted device 100 and used alone separately.

A description will now be given of features of the vehicle-mounted system 1 according to the present embodiment, with reference to FIG. 8.

Figure 8:
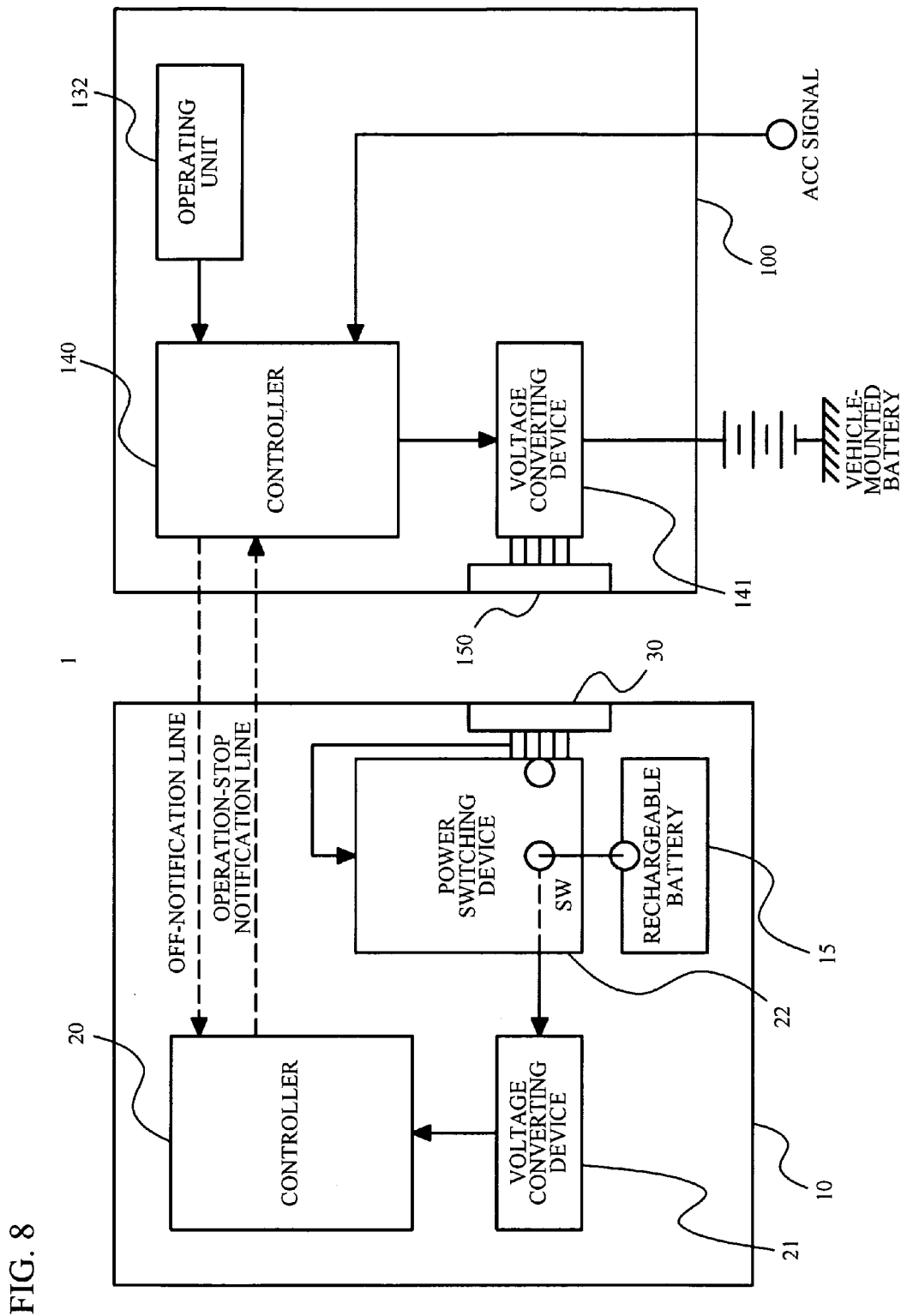
FIG. 8 is a block diagram showing another example of the vehicle-mounted system.

FIG. 8 is a block diagram showing another example of the vehicle-mounted system 1 explained by referring to FIG. 5. Respective elements identical to those of the vehicle-mounted system 1 shown in FIG. 5 are designated by identical reference numerals, and the description of the respective elements is omitted.

First, a description will now be given of the vehicle-mounted device 100. A voltage converting device 141 of the vehicle-mounted device 100 supplies the electric power from the vehicle-mounted battery to the portable device 10 via the connectors 150 and 30. The voltage converting device 141 supplies the electric power to the portable device 10 and stops supplying the electric power, by receiving control from the controller 140.

For example, when the controller 140 has received information showing that the power source of the vehicle-mounted device 100 has been turned off, through off of the ACC signal from the vehicle, the controller 140 transmits the information to the controller 20 of the portable device 10. This transmission is executed with a communication line (this is shown as "off-notification line" in FIG. 8) via the connectors 150 and 30. Here, although the off-notification line does not go through the connectors 150 and 30 in FIG. 8, the controllers 140 and 20 are mutually connected with the off-notification line to facilitate reader's understanding for convenience of explanation. An operation stop notification line described later is also illustrated in a similar fashion.

Next, a description will now be given of the portable device 10.

A power switching device 22 of the portable device 10 includes a switch SW. The switch SW switches connection with a side of the rechargeable battery 15 or a side of the connector 30. When the connection is switched to the side of the rechargeable battery 15, the electric power of the rechargeable battery 15 is supplied to a voltage converting device 21. When the connection is switched to the side of the connector 30, the electric power of the vehicle-mounted device 100 is supplied to the voltage converting device 21.

The switch SW is switched by whether the electric power is supplied from the vehicle-mounted device 100. When the power switching device 22 judges that the supply of the electric power from the vehicle-mounted device 100 has been stopped, the switch SW switches the connection to the side of the rechargeable battery 15. The power switching device 22 judges this by detecting change of the voltage of the power switching device 22 itself. It should be noted that the change of the voltage is notified to the controller 20, and the controller 20 may switch the switch SW.

The voltage converting device 21 supplies the electric power to the controller 20. Thereby, the controller 20 operates.

The electric power from the voltage converting device 21 is supplied to the controller 20. When the controller 20 has received information showing that the power has been turned off, from the controller 140 of the vehicle-mounted device 100, the controller 20 begins a shutdown process. The shutdown process is completed at about 10 seconds. When the shutdown process is completed, the controller 20 transmits information showing the completion of the shutdown process to the controller 140 of the vehicle-mounted device 100. As described above, this transmission is executed with a communication line (this is shown as "operation-stop notification line" in FIG. 8) via the connectors 150 and 30.

Therefore, the controller 140 of the vehicle-mounted device 100 receives the information showing the completion of the shutdown process from the controller 20 of the portable device 10, confirms the information, and then controls the voltage converting device 141 to stop supplying the electric power to the portable device 10. When supplying the electric power to the portable device 10 is stopped, the switch SW is switched to the side of the rechargeable battery 15 as described above. That is, the shutdown process of the controller 20 is executed by the electric power from the vehicle-mounted device 100. Even if the storage capacity of the rechargeable battery 15 is not enough, the supply of the electric power is not broken off on the way of the shutdown process of the controller 20.

Here, after the supply of the electric power is stopped, the portable device 10 can receive the electric power from the rechargeable battery 15. The storage capacity of the rechargeable battery 15 can be maintained without consuming only an amount of the electric power requested for the shutdown process. Thereby, even when the portable device 10 is detached from the vehicle-mounted device 100, and is used alone, portable time can be prolonged by just that much.

Figure 9:
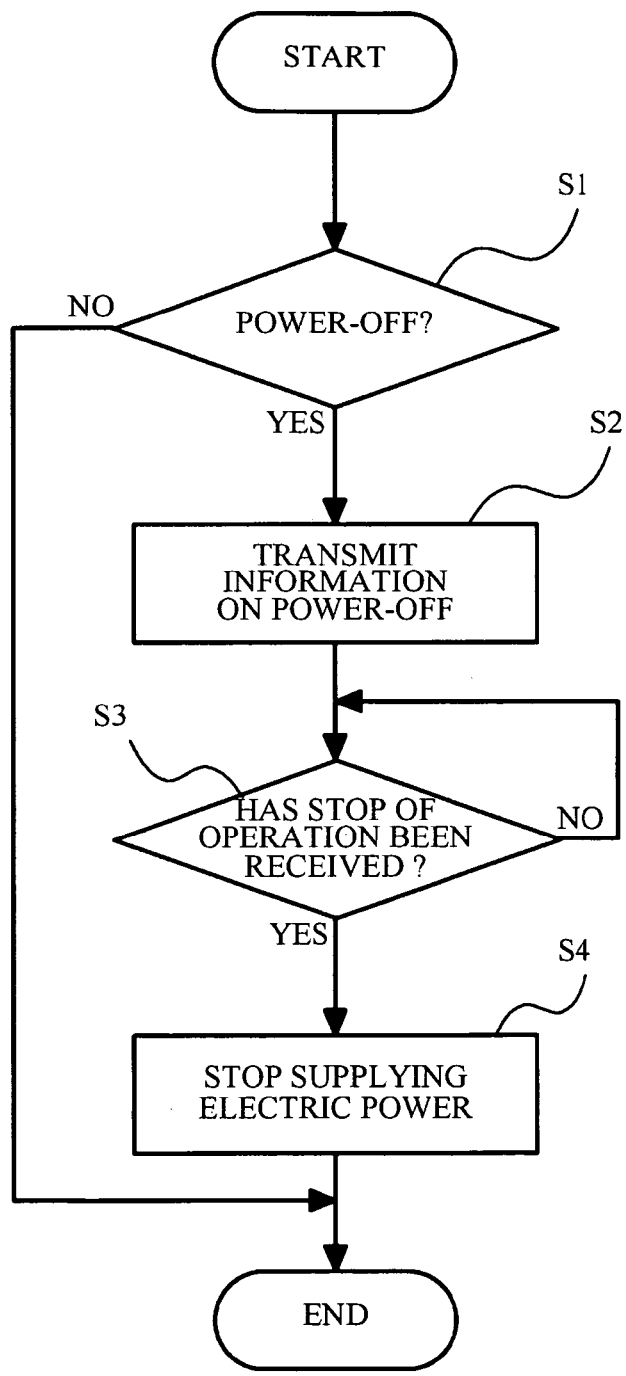
FIG. 9 is a flowchart showing an example of operation of the vehicle-mounted device.
Figure 10:
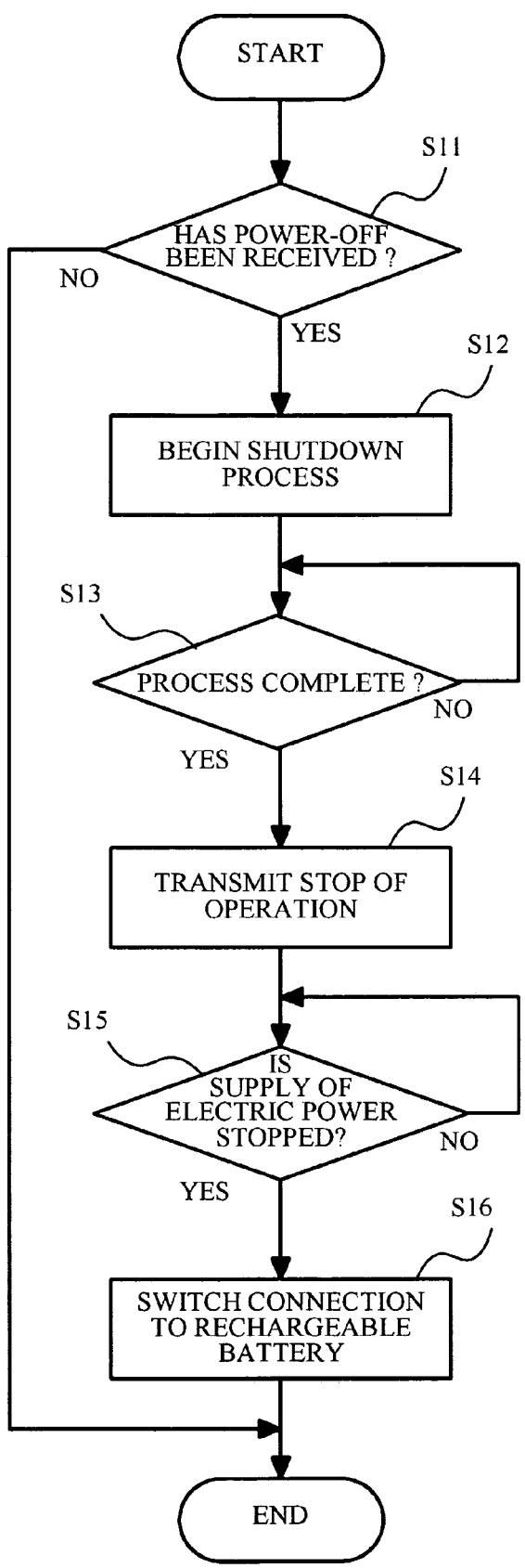
FIG. 10 is a flowchart showing an example of operation of the portable device.

Next, a description will now be given of operation of the vehicle-mounted system 1, with reference to FIGS. 9 and 10. FIG. 9 is a flowchart showing an example of operation of the vehicle-mounted device 100, and FIG. 10 is a flowchart showing an example of operation of the portable device 10.

First, a description will now be given of operation of the vehicle-mounted device 100.

The controller 140 of the vehicle-mounted device 100 judges whether the power source has been turned off, as shown in FIG. 9 (step S1). The judgment is executed by whether the ACC signal from the above-mentioned vehicle has become off. Unless the power source is turned off, subsequent processes are not executed. Therefore, various operations to the vehicle-mounted device 100 are executable.

When the controller 140 of the vehicle-mounted device 100 judges that the power source has been turned off, the controller 140 transmits information showing that the power source has been turned off, to the portable device 10 (step S2). When the information showing that the power source has been turned off is transmitted, the information may be an electric control signal, or an instruction such as a command (run command) for beginning the shutdown.

Next, the controller 140 of the vehicle-mounted device 100 judges whether the controller 140 has received information on stop of the operation (step S3). Thus, until the controller 140 receives the information on stop of the operation of the portable device 10, the controller 140 does not stop supplying the electric power as described later. That is, until the shutdown process is completed, the electric power from the vehicle-mounted battery through the vehicle-mounted device 100 keeps being supplied.

Here, when the controller 140 does not receive the information on stop of the operation even if a given time period has elapsed, the controller 140 may transmit the information showing that the power has been turned off. When a reception process by the portable device 10 is not normally done, there is a possibility that the reception process is normally done by the repeated transmission process. When the controller 140 does not receive the information on stop of the operation even if the controller 140 does the repeated transmission process, the controller 140 may cause the display unit 131 of the portable device 10 to display a warning such as a process error, or cause the speaker 145 to output a warning sound showing the process error.

When the controller 140 of the vehicle-mounted device 100 judges that the controller 140 has received the information on stop of the operation, the controller 140 controls the voltage converting device 141, so that the voltage converting device 141 stops supplying the electric power to the portable device 10 (step S4). Stopping the supply of the electric power may be judged by change in the voltage from the controller 140 according to the reception of the information on stop of the operation.

Next, a description will now be given of operation of the portable device 10.

As shown in FIG. 10, the controller 20 of the portable device 10 judges whether the controller 20 has received the information showing that the power source has been turned off, from the vehicle-mounted device 100 (step S11). When the controller 20 has received the information showing that the power source has been turned off, the controller 20 begins the shutdown process (step S12).

The controller 20 of the portable device 10 judges whether the shutdown process has been completed (step S13). Unless the shutdown process is completed, subsequent processes are not executed.

Next, when the controller 20 judges that the shutdown process has been completed, the controller 20 transmits the information showing stop of the operation to the vehicle-mounted device 100 (step S14). When the shutdown process has not been normally completed, the controller 20 may not transmit the information showing stop of the operation, or may transmit information showing the shutdown process has not been normally completed. Thereby, the vehicle-mounted device 100 can execute the above-mentioned operations.

Here, the power switching device 22 of the portable device 10 judges whether the supply of the electric power has been stopped (step S15). This judgment process is executed by the power switching device 22 of the portable device 10 itself detecting the change of the voltage. Unless the supply of the electric power is stopped, the power switching device 22 does not switch to supply of the electric power from the rechargeable battery 15 provided in the portable device 10.

When the power switching device 22 of the portable device 10 judges that the supply of the electric power has been stopped, the power switching device 22 switches the connection of the switch SW to the side of the rechargeable battery 15 in order to receive the supply of the electric power from the rechargeable battery 15 (step S16). Thereby, even when the portable device 10 is detached from the vehicle-mounted device 100, a user can operate the portable device 10.

Figure 11:
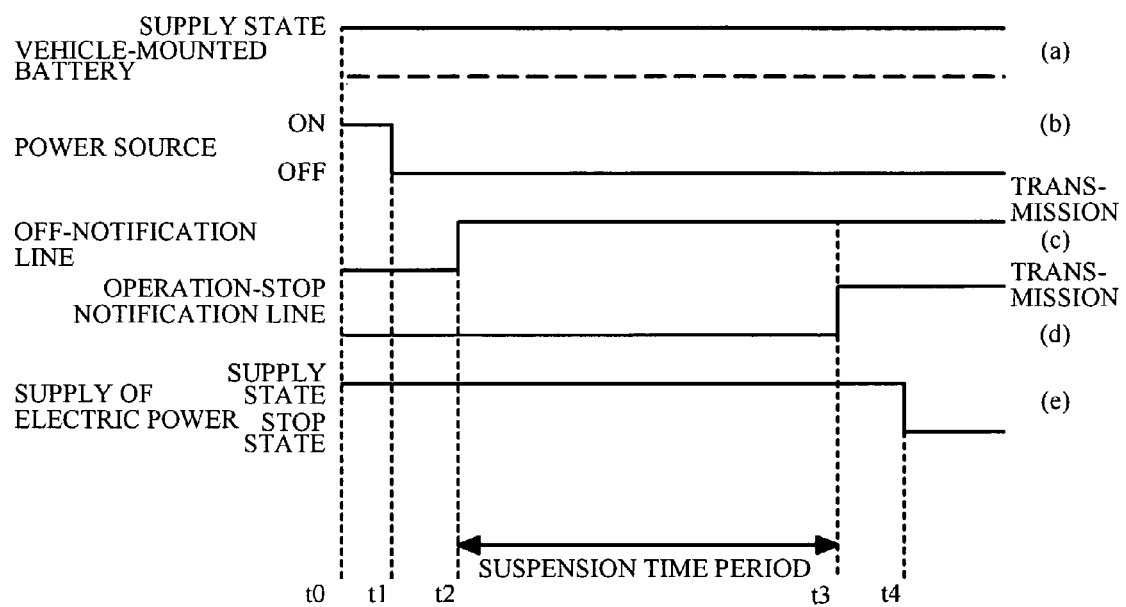
FIG. 11 is an example of timing charts showing change of voltages of the vehicle-mounted system.

Further, a description will now be given of operation of the above-mentioned vehicle-mounted system 1, with reference to FIG. 11. FIG. 11 is an example of timing charts showing change of voltages of the vehicle-mounted system 1.

The timing chart of the vehicle-mounted battery always shows a supply state as shown in a solid line of this figure (a). That is, the timing chart shows that the electric power is always supplied from the vehicle-mounted battery to the vehicle-mounted system 1. Here, a broken line of this figure (a) shows a state where the electric power is not supplied, for comparison of the supply state. For example, when the storage capacity of the rechargeable battery 15 is lost, the above-mentioned solid line shifts to the side of the broken line.

The timing chart of the power source shows change of the voltage according to on/off of the power source of the vehicle-mounted device 100. As shown in this figure (b), the power source is turned on from time t0 to time t1. When the power is turned off at the time t1, the voltage falls.

The timing chart of the off-notification line shows change of the voltage of the off-notification line connecting between the portable device 10 and the vehicle-mounted device 100. As shown in this figure (c), when the vehicle-mounted device 100 transmits the information showing that the power source has been turned off, the voltage rises. Therefore, the vehicle-mounted device 100 transmits the information showing that the power source has been turned off, to the portable device 10 at time t2 after a given time period has elapsed from the time t1 at which the power has been turned off. Here, it is desirable that the given time period between the time t1 and the time t2 is shorten as much as possible. For example, the given time period can be 0 to 1 second.

The timing chart of the operation-stop notification line shows change of the voltage of the operation-stop notification line connecting between the portable device 10 and the vehicle-mounted device 100. As shown in this figure (d), when the vehicle-mounted device 100 receives the information showing stop of the operation, the voltage rises. Therefore, the shutdown process is executed from the time t2 to time t3, and the voltage rises at the time t3 in which the information showing stop of the operation is received. A suspension time period between the time t2 and the time t3 is necessary for the shutdown process, and is about 10 seconds. When a time period necessary for the shutdown process is longer or shorter than the above-mentioned time period, the necessary time period may be shortened or prolonged arbitrarily.

The timing chart of the supply of the electric power shows that change of the voltage of the voltage converting device 141 in the vehicle-mounted device 100. As shown in this figure (e), when the electric power to the portable device 10 is in a supply state, the voltage rises. When the electric power is in a stop state, the voltage falls. Therefore, when the vehicle-mounted device 100 receives the information showing stop of the operation at the time t3, the vehicle-mounted device 100 detects the voltage of the operation-stop notification line, and the voltage of the voltage converting device 141 falls after a given time period has elapsed. Thereby, the supply of the electric power to the portable device 10 is stopped. Here, it is desirable that the given time period between the time t3 and time t4 is shorten as much as possible.

According to the vehicle-mounted system 1 of the present embodiment, even when the rechargeable battery 15 of the portable device 10 cannot be charged enough, the shutdown process can be safely executed. Accordingly, the damage of various information, data, signals, or the like used with the portable device 10, and the operation trouble of the portable device 10 can be evaded.

It should be noted that the present invention is not limited to above-described embodiment, and various modifications may be made to it without departing from the scope of the invention. For example, although in the present embodiment, the communication between the controllers is executed with fixed lines, the communication may be executed by wireless. Although in the above-mentioned FIG. 8, two communication lines are provided, a single communication line can be shared by a serial communication system when commands are communicated. Thereby, the complication of circuits can be evaded.

The invention claimed is:

1. An electronic device that is capable of attaching and detaching a portable device including a rechargeable unit, and supplies an electric power to the portable device in a attachment state where the portable device is attached, the electronic device comprising:

a control portion that confirms completion of the operation of the portable device when a power source of the electronic device is turned off in the attachment state; and a voltage converting portion that stops supplying the electric power to the portable device after the confirmation by the control portion.

2. The electronic device as claimed in claim 1, further comprising:

a communication line that transmits and receives a state of the power source of the electronic device and an operation state of the portable device;

wherein the control portion transmits the state of the power source to the portable device via the communication line, confirms the completion of the operation of the portable device, and then controls the voltage converting portion to stop supplying the electric power.

3. The electronic device as claimed in claim 2, wherein the control portion transmits and receives each other's states by any one of commands or electric control signals.

4. The electronic device as claimed in claim 3, wherein when the each other's states are transmitted and received by commands, the control portion transmits and receives the each other's states by a serial communication system.

5. An electronic system that comprises a portable device including a rechargeable unit, and an electronic device that is capable of attaching and detaching the portable device, and supplies an electric power to the portable device in a attachment state where the portable device is attached, the electronic system comprising:

the electronic device including:

a control portion that confirms completion of the operation of the portable device when a power source of the electronic device is turned off in the attachment state; and a voltage converting portion that stops supplying the electric power to the portable device after the confirmation by the control portion;

the portable device including:

a power switching portion that switches to the supply of the electric power from the rechargeable unit when the portable device detects that the supply of the electric power is stopped.

* * * * *